(12) United States Patent
Cheng

(10) Patent No.: US 7,315,578 B2
(45) Date of Patent: Jan. 1, 2008

(54) FAST SOFT VALUE COMPUTATION METHODS FOR GRAY-MAPPED QAM

(75) Inventor: Jung-Fu Cheng, Cary, NC (US)

(73) Assignee: Telefonaktiebolaget LM Ericsson (publ) (SE)

(*) Notice: Subject to any disclaimer, the term of this patent is extended or adjusted under 35 U.S.C. 154(b) by 818 days.

(21) Appl. No.: 10/746,434

(22) Filed: Dec. 24, 2003

(65) Prior Publication Data

US 2005/0141628 A1    Jun. 30, 2005

(51) Int. Cl.
*H04L 5/12*    (2006.01)
(52) U.S. Cl. ............... 375/261; 375/316; 455/60; 370/20; 329/304
(58) Field of Classification Search .............. 375/261, 375/262, 316; 329/304; 455/60; 370/20
See application file for complete search history.

(56) References Cited

U.S. PATENT DOCUMENTS

| 6,661,282 B2* | 12/2003 | Ha et al. | 329/304 |
| 7,139,335 B2* | 11/2006 | Kolze | 375/341 |
| 2002/0067777 A1* | 6/2002 | Jeong | 375/324 |
| 2002/0131515 A1* | 9/2002 | Rodriguez | 375/262 |
| 2004/0091058 A1* | 5/2004 | Tosato et al. | 375/261 |
| 2005/0201484 A1* | 9/2005 | Wilhelmsson et al. | 375/286 |

FOREIGN PATENT DOCUMENTS

| EP | 0887976 A2 | 12/1998 |
| EP | 1195908 A2 | 4/2002 |
| EP | 1294152 A2 | 3/2003 |

* cited by examiner

*Primary Examiner*—Mohammed Ghayour
*Assistant Examiner*—Juan Alberto Torres
(74) *Attorney, Agent, or Firm*—Coats & Bennett, P.L.L.C.

(57) ABSTRACT

A method and apparatus use unified equations to provide computationally efficient but exact solutions to bit soft value computations for Gray-coded QAM symbols in a received communication symbol as compared to carrying out region-specific equations that are keyed to particular regions of a nominal modulation constellation. Such unified equations further may include one or more correction terms that compensate the bit soft value computations for the effects on symbol samples of more than one "nearest" neighbor in the nominal modulation constellation. While the computations offer particular advantages for receivers making use of the HS-DSCHs used in WCDMA, the method and apparatus can be used in essentially any wireless receiver or system employing Gray-coded QAM.

89 Claims, 5 Drawing Sheets

FAST SOFT VALUE COMPUTATION METHODS FOR GRAY-MAPPED QAM

BACKGROUND OF THE INVENTION

The present invention generally relates to digital communication systems and particularly relates to the use of QAM communication signals in such systems.

Evolving wireless communication standards increasingly focus on achieving higher data rates while maintaining acceptable communication reliability. Such efforts typically involve the use of higher-order modulation methods that are more complex than the modulation standards used in earlier systems. For example, in contrast to the relatively simple constant-envelope frequency modulation adopted in the original Analog Mobile Phone System (AMPS), the developing Wideband CDMA (WCDMA) standards have adopted 16-ary Quadrature Amplitude Modulation (16QAM) for use in the High Speed Downlink Shared Channels (HS-DSCHs) defined by those standards. Other developing third generation ("3G") and fourth generation ("4G") wireless communication systems also have adopted some form of higher order QAM, with some systems using or investigating the use of 64QAM and higher.

Receivers, e.g., wireless communication terminals, etc., receiving such signals must "map" the received symbols into a defined modulation constellation corresponding to the particular order of QAM being used. For example, 16QAM defines sixteen constellation points, each defined by a unique pairing of phase and amplitude, and each representing a unique four-bit value. Thus, source information bits are mapped four-at-a-time into corresponding 16QAM modulation symbols that ultimately are transmitted via an associated carrier frequency signal. The receiver's job in simplified terms thus becomes one of determining what symbols were received by evaluating where the received symbols fall in the defined modulation constellation in terms of their amplitude and phase. A nominal 16QAM constellation comprises four rows of four constellation points each, symmetrically distributed about an x-y (real-imaginary) origin at a desired point spacing.

In one type of 16QAM encoding, the modulation symbols are Gray-coded, wherein the binary representations of the respective modulation symbols differ by one bit from neighbor-to-neighbor. Various approaches exist for demodulating Gray-coded QAM. Commonly, rather than making "hard" decoding decisions, e.g., "1" or "0" per bit decisions, receivers employ some form of "soft" decoding wherein the individual bits conveyed by the received QAM symbols are estimated, or otherwise assigned a "confidence" weighting indicating the quality of each bit decision. In the context of Gray-coded QAM, such bit soft value computations may be performed using region-specific equations, wherein the calculation performed to compute a given bit's soft value depends on the particular region of the modulation constellation the received symbol lies in. Such an approach can lead to computational inefficiencies because of the selection logic overhead associated with selecting the appropriate equation(s) to use for each region.

Past approaches have overcome regional solution inefficiencies by propounding simplified soft value equations that span two or more constellation regions, thus obviating the need for per region soft value equations. However, since such approaches are based on simplifying approximations, they do not yield exact solutions in the sense that the bit soft values obtained from carrying out the simplified equations do not match exactly the results that would be obtained by carrying out the full, region-specific equations.

SUMMARY OF THE INVENTION

The present invention comprises a method and apparatus to provide computationally efficient but exact bit soft value computations for Gray-coded Quadrature Amplitude Modulation (QAM). By way of non-limiting example, the present invention may be applied advantageously in mobile terminals and other wireless communication receivers operating in Wideband CDMA communication networks, which use 16-ary QAM (16QAM) on High Speed Downlink Shared Channels (HS-DSCHs).

More broadly, in an exemplary embodiment, the present invention comprises a method of computing bit soft values from Gray-coded modulation symbols in a received communication signal. The method comprises providing a set of unified equations, each unified equation corresponding to a bit position of the bit soft values to be computed and yielding the exact solution as an applicable regional equation selected from a set of regional equations associated with a nominal modulation constellation for that bit position, generating symbol samples of the Gray-coded modulation symbols in the received communication signal, each symbol sample comprising real and imaginary components, scaling either the symbol samples or the nominal modulation constellation to compensate for a received amplitude of the modulation symbols. Bit soft values then are determined for each scaled symbol sample based on, for each bit position to be determined, calculating the bit soft value by solving the corresponding unified equation using either the real or the imaginary component of the scaled symbol sample depending on the bit position.

The above method, or exemplary variations thereof, may be implemented in an ASIC, FPGA, or other such logic circuit, and may be implemented as stored program instructions for execution by a DSP or other microprocessor. For example, a baseband DSP in a mobile terminal or other wireless communication receiver can be configured to implement the above-described unified equations, thereby enabling a computationally efficient mechanism for obtaining bit soft values corresponding to received Gray-coded QAM symbols. Of course, the present invention is not so limited, and those skilled in the art will appreciate its additional features and advantages upon reading the following description, and upon viewing the accompanying drawings.

DETAILED DESCRIPTION OF THE INVENTION

Figure 1:
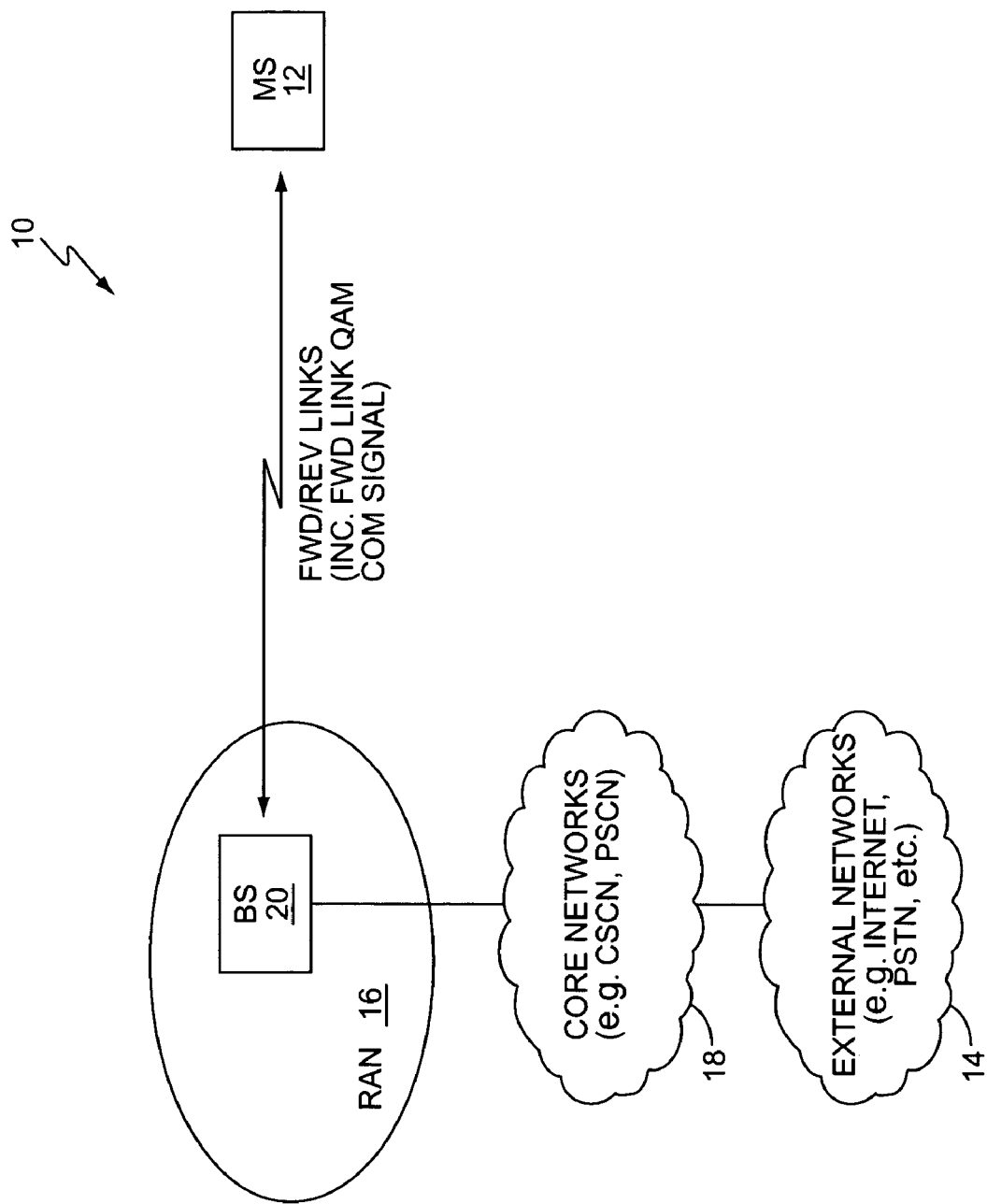
FIG. 1 is a diagram of a wireless communication network configured according to an exemplary embodiment of the present invention.

FIG. 1 is a diagram of an exemplary communication network 10, which may be configured according to a variety of wireless communication network standards, including WCDMA, IS-2000 (cdma2000), etc. Those skilled in the art will appreciate that the illustration simplifies certain details of network 10, but such details are not required for understanding or discussing the present invention. In actual implementation, network 10 may include more or different entities than those illustrated and, further, some or all of the nomenclature might change, depending upon the particular network standard involved.

Regardless, the exemplary network 10 communicatively couples a plurality of mobile terminals—one mobile terminal 12 is illustrated for simplicity—to one or more external networks 14, which may comprise the Internet and/or other Public Data Networks (PDNs), the Public Switched Telephone Network (PSTN), and other communication/data networks. Radio Access Network (RAN) 16 and one or more "Core Networks" (CNs) 18 cooperate to carry data to and from the mobile station 12. Such CNs may comprise a Packet Switched Core Network (PSCN) configured to carry packet data into and out of network 10, and/or a Circuit Switched Core Network (CSCN) configured to carry circuit-switched data, e.g., 64 kbit PCM voice and data, into and out of network 10.

Regardless of the particular details of network 10, it is contemplated that RAN 16 transmits forward link communication signals to mobile terminal 12 and receives reverse link communication signals from it. Such transmission and reception may be supported by a Base Station (BS) 20, or some other transceiver entity within network 10. Indeed, as with the aforementioned simplifications, RAN 16 may comprise multiple BSs 20, and mobile terminal 12 may communicate simultaneously with one or more BSs 20 or other network transceivers. In any case, for purposes of this discussion, mobile terminal 12 receives at least one forward link traffic (or control) channel signal that carries QAM symbol information. By way of non-limiting example, mobile terminal 12 receives a packet data signal from network 10 that uses 16QAM (or some other order of QAM).

Figure 2:
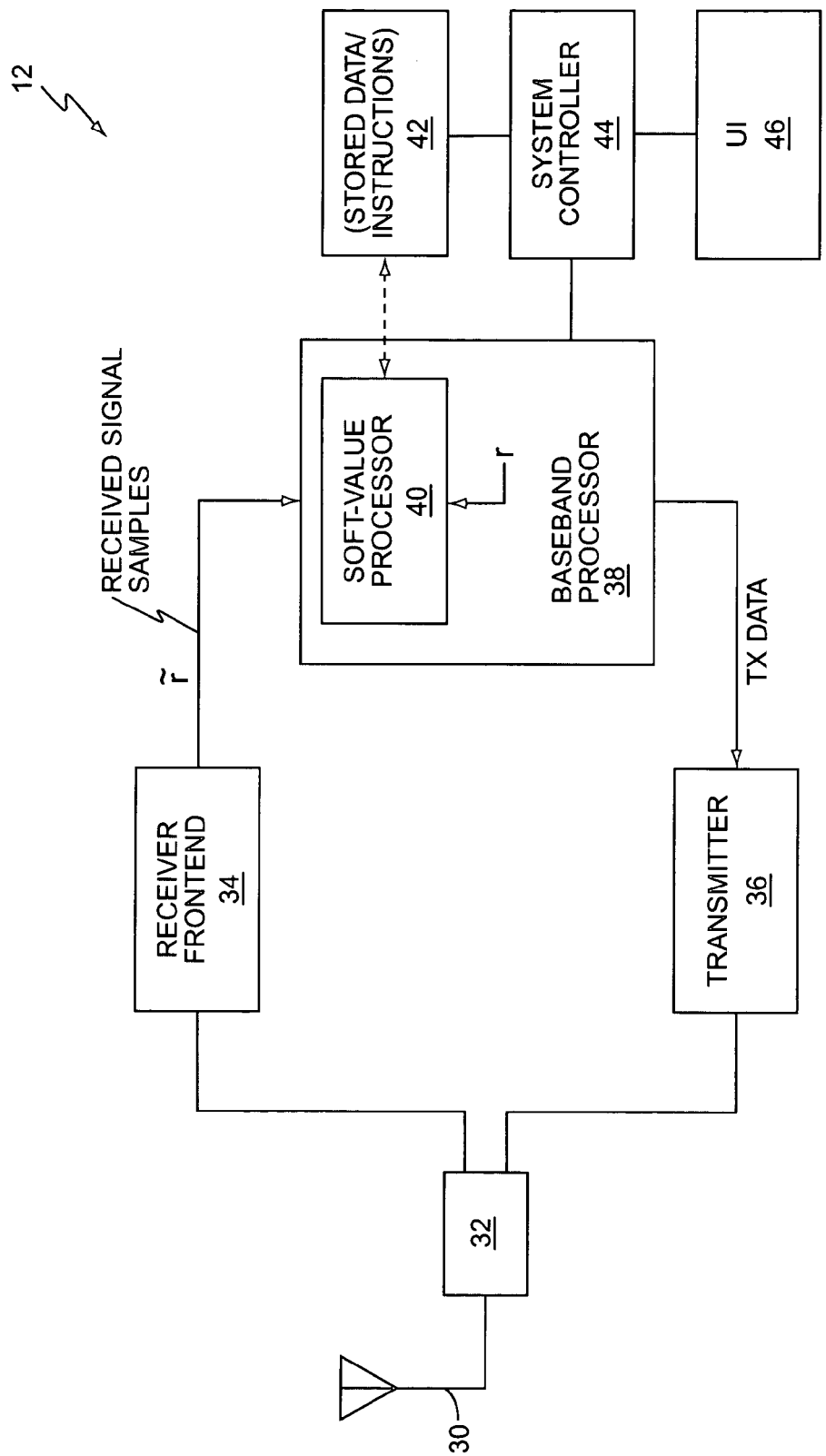
FIG. 2 is a diagram of a mobile terminal configured according to an exemplary embodiment of the present invention.

In support of receiving the QAM data signal, along with other traffic, control, and broadcast channel signals, FIG. 2 illustrates exemplary details for mobile terminal 12. The illustrated mobile terminal 12 comprises a transmit/receive antenna 30, an associated duplexer and/or switch circuit 32, a receiver front-end circuit 34, a transmitter circuit 36, a baseband processor circuit 38 that comprises, among other elements, a soft-value processing circuit 40, one or more memory/storage devices 42, a system controller 44, and a user interface (UI) 46 that, for example, comprises a display screen, a keypad, speakers, microphone, etc.

Note that the illustrated mobile terminal 12 may comprise a radiotelephone for use in a wireless (cellular) communication network, but it should be understood that the term as used herein has a broader connotation. Indeed, as used herein, the term "mobile terminal" refers to any wireless communication device, such as a pager, a computer modem card, a Portable Digital Assistant (PDA), a laptop/notebook/palmtop computer with external or built-in wireless connectivity, and essentially any other "pervasive" computing device.

Figure 3A:
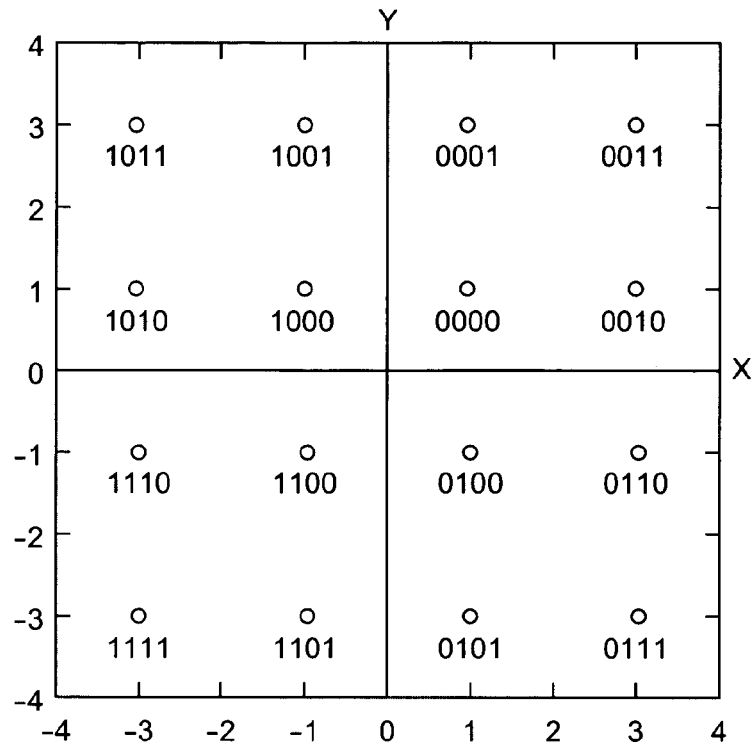
FIG. 3A is a diagram of an exemplary nominal modulation constellation for 16QAM.
Figure 3B:
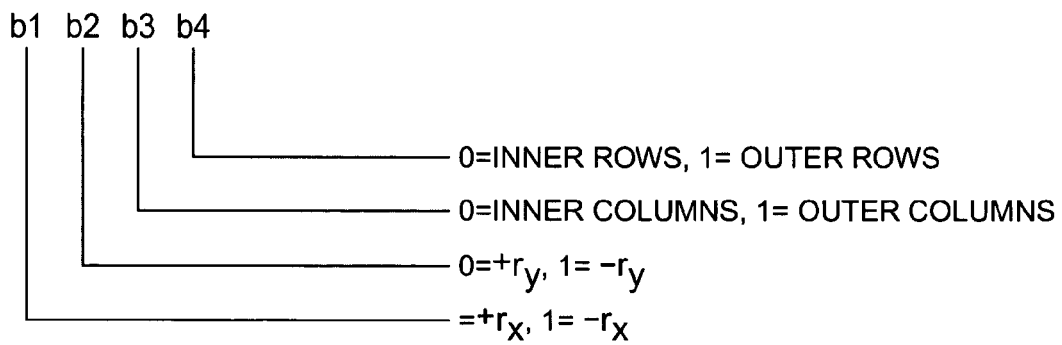
FIG. 3B is a diagram of corresponding, exemplary Gray-code bit mappings.

In any case, mobile terminal 12 receives and demodulates a QAM signal transmitted by network 10. FIG. 3A illustrates a nominal modulation constellation for embodiments relating to Gray-coded 16QAM signals, wherein the nominal modulation constellation comprises sixteen symmetrically spaced constellation points, with each point representing a uniquely ordered combination of four bits. FIG. 3B illustrates exemplary Gray-code bit mapping for the four bit positions of the 16QAM, wherein the first (leftmost) bit position represents the sign of $r_x$, the next bit position represents the sign of $r_y$, the next bit position indicates inner/outer columns, and the next (last) bit position indicates inner/outer rows. BS 20 uses a representation of this constellation to modulate source information bits for transmission to mobile terminal 12, and mobile terminal 12 stores or otherwise maintains a logical representation of the same constellation for use in demodulating the symbols it receives.

Figure 4:
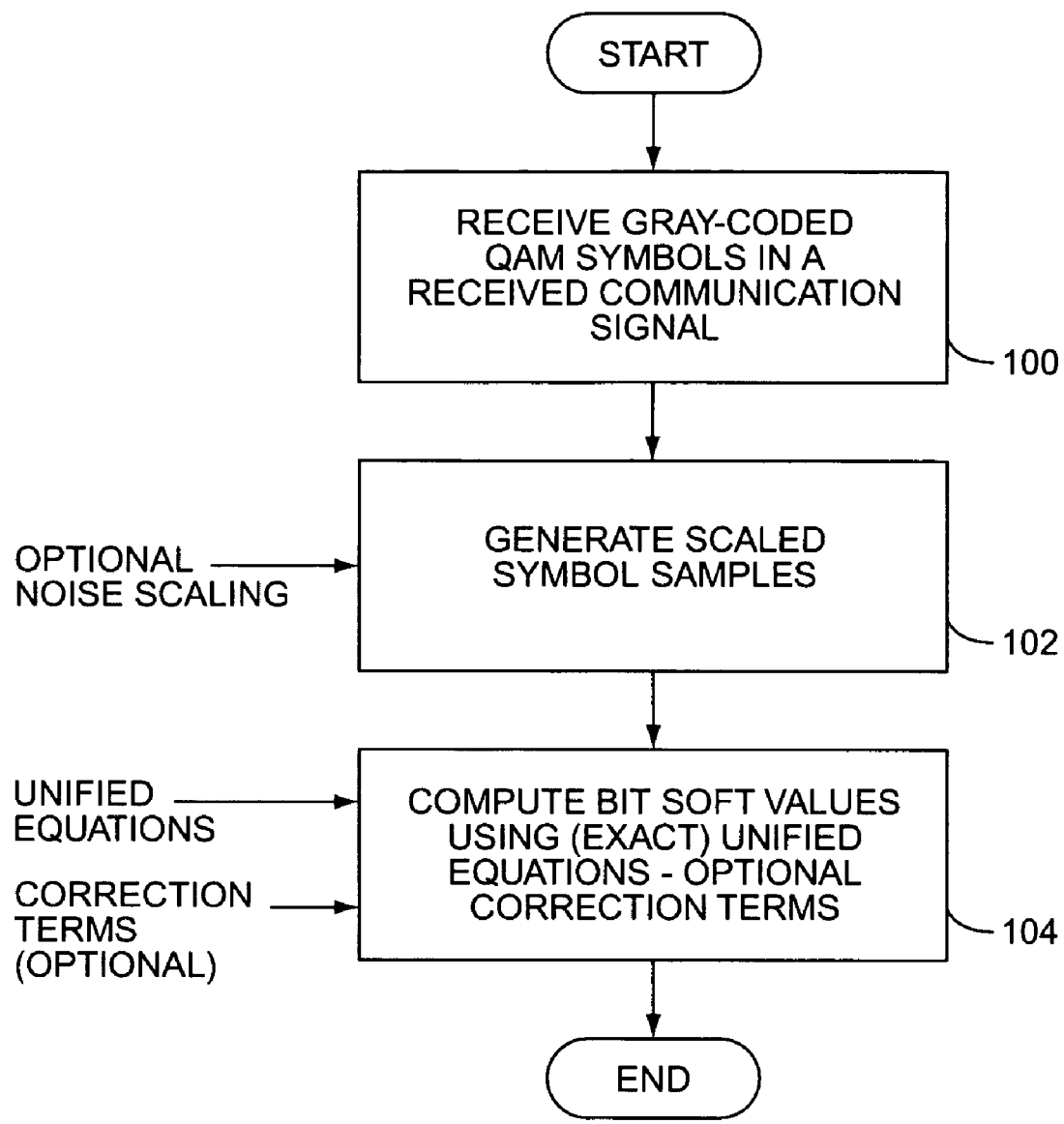
FIG. 4 is a diagram of exemplary processing logic configured to carry out bit soft value computations for received QAM symbols according to one or more embodiments of the present invention.

FIG. 4 broadly illustrates an exemplary demodulation process resulting in the generation of "exact" bit soft values in accordance with the present invention. In general, processing "begins" with mobile terminal 12 receiving a stream of Gray-coded modulation symbols contained in a communication signal transmitted by network 10 (Step 100). Because the as-received symbol values suffer the effects of channel corruption, e.g., phase shifting, attenuation, etc., they typically do not correspond very well to the points in the nominal modulation constellation. (However, the received symbols do maintain their relative constellation positions with respect to each other.)

As a point of processing simplification, mobile terminal 12 "scales" the received symbols, i.e., it compensates them for channel effects, gain, etc., such that they are "normalized" with respect to the nominal modulation constellation (Step 102). While this process is explained in more detail later herein, in an exemplary embodiment, it involves at least scaling the amplitudes of the received symbols to normalize them with respect to the amplitude scale of the nominal modulation constellation. Optionally, the mobile terminal 12 further scales the symbols, before, after, or concurrent with any other scaling, to compensate them for measured noise in the received signal samples. For example, in one exemplary embodiment, the scaled symbols samples (or the computed bit soft values) are scaled or otherwise compensated for the signal-to-noise ratio of the received symbol samples. Alternatively, the scaling is based on the average energy of the received symbol samples.

Once it generates the scaled symbol samples, mobile terminal 12 then computes bit soft values for each bit position of the modulated symbol values using (exact) unified equations that provide the same soft value computation results as would the applicable region-specific bit soft value equations for the nominal modulation constellation (Step 104). These unified equations optionally may include so called "correction terms" that take into consideration the effects on each of the scaled symbol samples of two or more "nearest" neighbors in the nominal modulation constellation.

In more detail, the received QAM signal may be filtered, amplified, and down-sampled by receiver front-end 34 to generate a digital sample stream, e.g., In-phase (I) and Quadrature (Q) sample streams corresponding to real and imaginary signal components, for input to baseband processor 38. Each received symbol in that sample stream may be referred to as $\tilde{r}$, and, after appropriate RAKE type combining, the symbol may be represented as, $$\tilde{r} = w^H h \tilde{s} + \tilde{n} = g w^H h_r \tilde{s} + \tilde{n} \tag{1}$$

where $\tilde{s}$ is the transmitted symbol with unit average symbol energy, h is the vector of the multipath channel response of the channel of interest (e.g., a HS-DSCH in a WCDMA network), $h_r$ is the channel response of the reference channel (e.g., a pilot or other channel transmitted in association with the QAM channel of interest), g is the channel gain offset between the data channel and the reference channel (e.g., a traffic-to-reference channel gain), w is the RAKE type combining weight, and $\tilde{n}$ is the interference or noise term. (Note that an exemplary receiver front-end 34 may include RAKE fingers and combining circuits or baseband processor 38 may provide all or part of such RAKE receiver functions.) These parameters generally can be estimated from the pilot channel or symbols in a CDMA system. Information regarding exemplary estimation methods is given in the co-pending and commonly assigned patent application by Yi-Pin Eric Wang, that is entitled "METHOD AND APPARATUS FOR SIGNAL DEMODULATION." That application, which is incorporated herein by reference, was filed on 26 Sep. 2003, and is identified by application Ser. No. 10/672,492.

Mobile terminal 12 is configured to scale the received symbols to normalize them relative to the nominal modulation constellation and thereby simplify the bit soft value computations. More particularly, baseband processor 38 (e.g., processing circuit 40) may be configured to perform such scaling. (Note that in the illustrated nominal modulation constellation, the closet point-to-point spacing is two, and this determines the appropriate scaling, and also influences one or more of the coefficients appearing in the unified equations described later herein.) Exemplary scaling for the 16QAM shown in FIG. 3A is given as, $$r = \frac{\sqrt{10}}{g w^H h_r} \tilde{r} = s + n, \quad (2)$$

where s is the scaled transmitted symbol whose inter-symbol distance is two and n is the scaled interference and noise with variance given by $$\sigma_n^2 = \frac{10 \cdot w^H R w}{g^2 |w^H h_r|^2}. \quad (3)$$

The log-likelihood of the symbol s can then be expressed as $$\Lambda(s) = -\frac{1}{\sigma_n^2} |r - s|^2. \quad (4)$$

With this, mobile terminal 12 can be configured to carry out the complete demodulation process of 16QAM as follows:

1. Estimate $h_r$ from the reference channel (common pilot channel (CPICH) signal or pilot symbols). Compute the combining weights according the principles of an appropriate RAKE type combiner.
2. Estimate the signal-to-noise ratio (SNR). With such an estimate, the scaling can be expressed as, $$r = \frac{\sqrt{10}}{SNR} \tilde{r} = s + n \quad (5)$$

With this estimate, the variance of the scaled noise becomes $$\sigma_n^2 = \frac{10}{SNR}. \quad (6)$$

Optionally, the SNR can be approximated by the average energy of the symbol samples.
3. Scale the combined symbol values for normalization with respect to the nominal modulation constellation and, optionally, noise as shown above.
4. Compute bit-level soft values from the received symbols.

With proper scaling given by (2), the transmitted 16QAM symbols of the forward link channel signal being received by the mobile terminal 12, e.g., a HS-DSCH signal in a WCDMA network, can be thought of as one of the symbols from the Gray-mapped 16QAM constellation shown in FIG. 3A. The optimal LogMAP (Maximum Post Priori) bit soft value is computed as $$\Lambda(b_i) = \underset{\hat{s}: B_i(\hat{s})=1}{COM} (\Lambda(\hat{s})) - \underset{\hat{s}: B_i(\hat{s})=0}{COM} (\Lambda(\hat{s})), \quad (7)$$

where $\{\hat{s}:B_i(\hat{s})=b\}$ is the set of constellation points $\hat{s}$ whose i-th bit is b and the COM operation is defined as $$\underset{i}{COM}(x_i) \triangleq \ln\left(\sum_i e^{x_i}\right). \quad (8)$$

Eq. (7) may be computationally expensive to implement, although there are ways to approximate the COM operation. One such approximation replaces the COM operation by a "max" operation, leading to the LogMax demodulation algorithm:

$$\Lambda(b_i) = \underset{\hat{s}: B_i(\hat{s})=1}{\max} (\Lambda(\hat{s})) - \underset{\hat{s}: B_i(\hat{s})=0}{\max} (\Lambda(\hat{s})). \quad (9)$$

With Eq. (9), the soft value for the i-th bit is obtained by subtracting the largest symbol log-likelihood among the set of symbols with i-th bit being 0 from the largest symbol log-likelihood among the set of symbols with i-th bit being 1. Eq. (9) is referred to herein as the "Direct LogMax" demodulator. One drawback of the Direct LogMax demodulator is its computational overhead. For the exemplary 16QAM shown in FIG. 3A, it requires about twenty-eight additions and eight multiplications per bit soft value. In comparison, use of the unified equations provided by the present invention requires only about two additions and one multiplication per soft value.

In the exemplary 16QAM constellation shown in FIG. 3A, the first bit in the Gray mapping determines the sign of the real part, i.e., whether the symbol is on the left or on the right of the y-axis. Similarly, the second bit determines whether the symbol is above or below the x-axis. (For this discussion, $r_x$ and $r_y$ denote the real and imaginary parts—components—of the symbol value r, respectively.) Further, as noted earlier, the third bit determines whether the symbol belongs to the inner two columns or the outer two columns of modulation constellation points. Similarly, the fourth bit determines whether the symbol belongs to the inner two rows or the outer two rows of modulation constellation points.

These properties can be exploited to simplify the computation of LogMax soft values. For instance, suppose the real part of the scaled combined symbol value r lies in (−2,2). The LogMax soft value of the first bit is then $$\Lambda(b_1) = \max \begin{pmatrix} -|r_x+1|^2 - |r_y-3|^2 \\ -|r_x+1|^2 - |r_y-1|^2 \\ -|r_x+1|^2 - |r_y+1|^2 \\ -|r_x+1|^2 - |r_y+3|^2 \end{pmatrix} - \quad (10)$$

$$\max \begin{pmatrix} -|r_x+1|^2 - |r_y-3|^2 \\ -|r_x+1|^2 - |r_y-1|^2 \\ -|r_x+1|^2 - |r_y+1|^2 \\ -|r_x+1|^2 - |r_y+3|^2 \end{pmatrix}$$

$$= \left[ -|r_x+1|^2 + \max\begin{pmatrix} -|r_y-3|^2 \\ -|r_y-1|^2 \\ -|r_y+1|^2 \\ -|r_y+3|^2 \end{pmatrix}\right] -$$

$$\left[ -|r_x-1|^2 + \max\begin{pmatrix} -|r_y-3|^2 \\ -|r_y-1|^2 \\ -|r_y+1|^2 \\ -|r_y+3|^2 \end{pmatrix}\right]$$

$$= |r_x-1|^2 - |r_x+1|^2.$$

Therefore, the soft value of the first bit does not depend on the imaginary part of r. In fact, the following can be established for computing (LogMax or LogMAP) bit soft values of Gray-mapped 16QAM:

Soft values $\Lambda(b_1)$ and $\Lambda(b_3)$ depend on $r_x$ only.
Soft values $\Lambda(b_2)$ and $\Lambda(b_4)$ depend on $r_y$ only.

These properties were observed in U.S. Pat. No. 6,078,626 to Ramesh where they were exploited to develop "non-exact" equations for yielding approximated bit soft values. As used, herein, the term "non-exact" connotes a bit soft value computation that that does not provide the same bit soft values as would be obtained from the applicable "regional" equation corresponding to the constellation modulation region in which the symbol of interest lies. These details are given more thorough treatment below.

Using the sign/column/row properties of the bit positions for Gray-coded QAM symbols, it may be shown that the bit soft values for the various bit positions may be determined according to the applicable one of the aforementioned regional equations. It can be shown for the constellation of FIG. 3A that:

$$\Lambda(b_1) = \begin{cases} 8 - 8r_x & \text{if } r_x > 2 \\ -4r_x & \text{if } -2 \leq r_x \leq 2 \\ -8 - 8r_x & \text{if } r_x < -2 \end{cases}$$

$$\Lambda(b_3) = \begin{cases} -8 + 4r_x & \text{if } r_x \geq 0 \\ -8 - 4r_x & \text{if } r_x < 0. \end{cases}$$

Similar results can be derived for $\Lambda(b_2)$ and $\Lambda(b_4)$ on the imaginary symbol component, $r_y$. These results provide a computational basis for determining bit soft values according to the appropriate regional equation, i.e., the particular equation used to compute the soft value for a given bit position would change depending on which region of modulation constellation the received (scaled) symbol value lies in. Thus, as part of decoding a succession of received symbols, the computational logic must (1) identify the region of each symbol, and (2) select and carry out the applicable regional equation. Such operations do not favor fast bit soft value computations, and the overhead associated with the required regional decision logic adds undesirable complexity to logic-based implementations of the bit soft value computations.

The present invention alters this approach by providing unified equations, i.e., the same unified equation is used for a given bit position irrespective of the constellation region involved. Such equations obviate the need for the sequential "table look-up" operational overhead associated with the regional equation approach, and yet provide the exact solution as would be obtained from the regional equations. As used herein, the present invention's exemplary unified equation method(s) generally are referred to as the Fast Exact LogMax method. The unified equations according to the Fast Exact LogMax method corresponding to the above-given regional equations may be expressed as, $$\Lambda(b_i) = \frac{2}{\sigma_n^2} \lambda_i' \quad i = 1, 2, 3, 4, \quad (11)$$

$$\text{where } \begin{cases} \lambda_1' = -4r_x + |r_x+2| - |r_x-2| \\ \lambda_2' = -4r_y + |r_y+2| - |r_y-2| \\ \lambda_3' = -4 + 2|r_x| \\ \lambda_4' = -4 + 2|r_y|. \end{cases} \quad (12)$$

One sees in Eq. (11), the optional scaling based on the inverse of the noise power $\rho_n^2$.

The above unified equations optionally may be compensated to account for "nearest" neighbor effects. That is, the bit soft values computed from the above unified equations may be compensated to account for two or more nearest constellation points in the nominal modulation constellation. Such an approach adds one or more correction terms to the unified equations and computation of bit soft values using these compensated unified equations are referred to herein as the "Fast LogLin" method, because the compensated unified equations approach the optimal LogMAP solution in terms of performance. As such, the correction terms may be thought of as "multi-regional" compensation terms that incorporate the effects of constellation points from two or more regions into the unified equations.

Exemplary unified equations according to the Fast LogLin method are given as, $$\Lambda(b_i) = \frac{2}{\sigma_n^2} \lambda_i', \quad i = 1, 2, 3, 4, \quad (13)$$

where (14)

-continued $$\begin{cases} \lambda'_1 = -4r_x + |r_x + 2| - |r_x - 2| + f_c(|r_x + 2|) - f_c(|r_x - 2|) \\ \lambda'_2 = -4r_y + |r_y + 2| - |r_y - 2| + f_c(|r_y + 2|) - f_c(|r_y - 2|) \\ \lambda'_3 = -4 + 2|r_x| + f_c(3|r_x|) - f_c(|r_x|) \\ \lambda'_4 = -4 + 2|r_y| + f_c(3|r_y|) - f_c(|r_y|) \end{cases}$$ (15)

and $$f_c(x) \triangleq \left(\frac{\ln 2}{2} - \frac{x}{2}\right)_+ \triangleq \begin{cases} \frac{\ln 2}{2} - \frac{x}{2}, & \text{if } \frac{\ln 2}{2} - \frac{x}{2} \geq 0 \\ 0 & \text{otherwise} \end{cases}.$$

The expression $x + f_c(x)$ can be implemented efficiently using pipelines, which is advantageous where processing circuit 38 of mobile terminal 12 and, particularly, the soft-value processor 40, comprises one or more ASICs, microprocessors, or other logic-processing devices.

Figure 5:
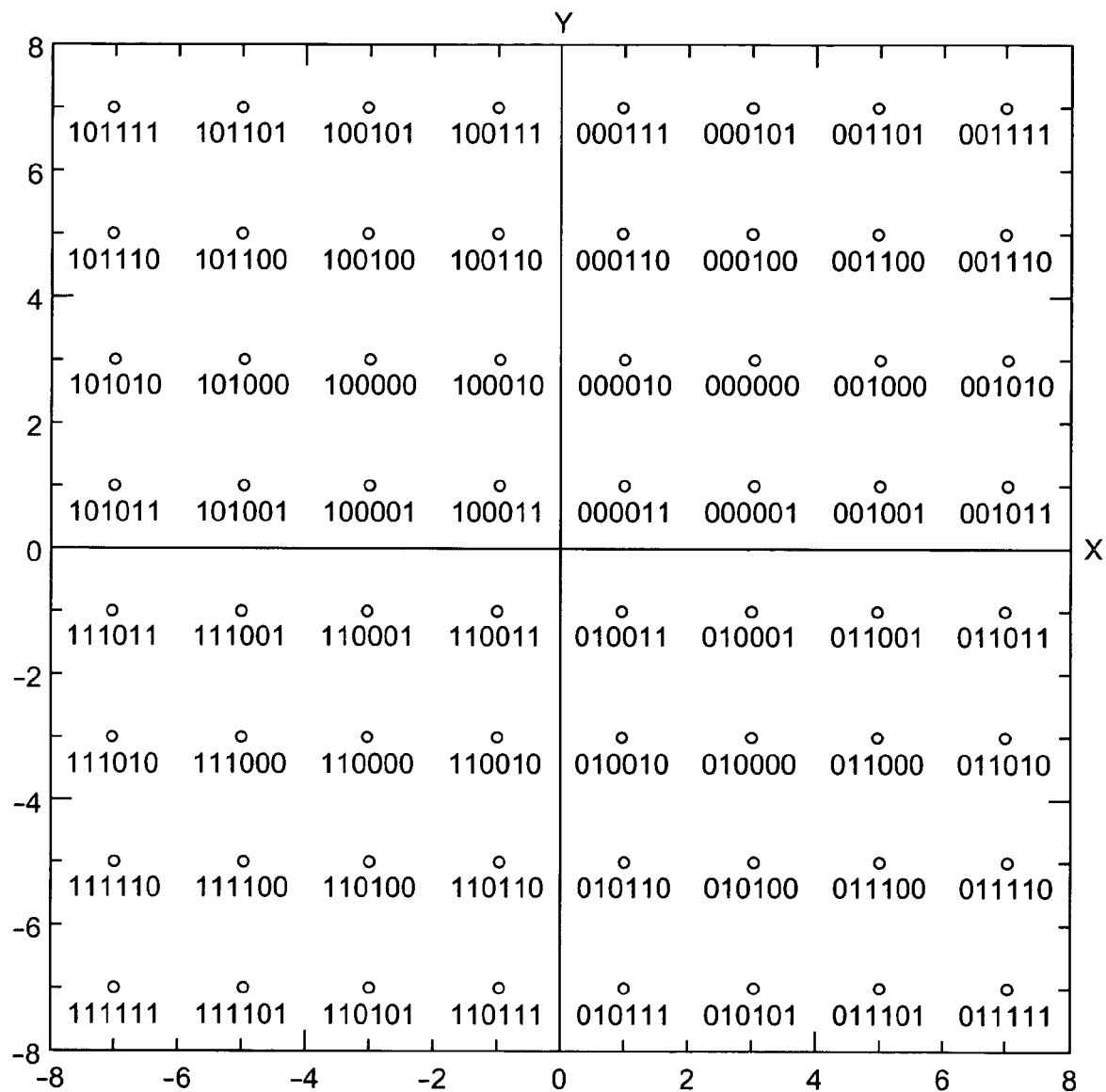
FIG. 5 is a diagram of an exemplary nominal modulation constellation for 64QAM.

Of course, the present invention can be applied to other-than 16QAM. For an exemplary nominal 64QAM constellation as shown in FIG. 5, the Fast Exact LogMax method according to the present invention is given by $$\Lambda(b_i) = \frac{2}{\sigma_n^2} \lambda'_i, \quad i = 1, 2, \ldots 6,$$ (16)

where (17)

$$\begin{cases} \lambda'_1 = -8r_x + |r_x + 2| - |r_x - 2| + |r_x + 4| - \\ \quad |r_x - 4| + |r_x + 6| - |r_x - 6| \\ \lambda'_2 = -8r_y + |r_y + 2| - |r_y - 2| + |r_y + 4| - \\ \quad |r_y - 4| + |r_y + 6| - |r_y - 6| \\ \lambda'_3 = -16 + 4|r_x| - ||r_x| - 2| + ||r_x| - 6| \\ \lambda'_4 = -16 + 4|r_y| - ||r_y| - 2| + ||r_y| - 6| \\ \lambda'_5 = -4 + |2|r_x| - 8| \\ \lambda'_6 = -4 + |2|r_y| - 8| \end{cases}$$

Those skilled in the art will appreciate that additional versions of the unified equations may be given for essentially any order QAM, and that the particular coefficients, e.g., the "2", "4", and "8", appearing in the above equations may change or be altered depending on, for example, the nominal modulation constellation being mapped into and the scaling factors. Further, referring again to FIG. 3A, one might change the bit position definitions for the four bits of 16QAM and such reshuffling of the bits will change which of the four equations is used for each of the four bit positions. That is, the form of the equations will not change with a reordering of the QAM bits, but the particular unified equation to be used for computing the bit soft value for particular QAM bit position will change.

For example, with respect to the bit mappings used for the nominal modulation constellation given in FIG. 3B, the first (leftmost) bit indicated whether the symbol was on the left or right side of the imaginary (quadrature) axis, and the second bit position indicated whether the symbol was above or below the real (in-phase) axis. With that particular bit mapping, the bit soft value for the first position was obtained using the unified equation shown in Eq. (12) for $\lambda'_1$, which depended on $r_x$. Likewise, the bit soft value for the second bit position was obtained using the unified equation shown for $\lambda'_2$, which depended on $r_y$. If one were to swap these bit definitions such that the first bit position indicated above/below and the second bit position indicated left/right, then one would swap the unified equations accordingly. Note, too, that with such swapping, the bit soft value for the first position would depend on $r_y$, and the bit soft value for the second position would depend on $r_x$.

As an illustration, if one swapped the first and third bits in the bit mapping depicted in FIGS. 3A and 3B, then $\lambda'_1$ should be renamed $\lambda'_3$ and $\lambda'_3$ should be renamed $\lambda'_1$ in Eq. (12). Continuing this illustration with a proposed swapping of bits two and three for the 16QAM constellation of FIG. 3A, the soft values can be calculated as, $$\Lambda(b_i) = \frac{2}{\sigma_n^2} \lambda'_i, \quad i = 1, 2, 3, 4,$$ (18)

where (19)

$$\begin{cases} \lambda'_1 = -4r_x + |r_x + 2| - |r_x - 2| \\ \lambda'_2 = -4 + 2|r_x| \\ \lambda'_3 = -4r_y + |r_y + 2| - |r_y - 2| \\ \lambda'_4 = -4 + 2|r_y|. \end{cases}$$

Therefore, those skilled in the art will thus appreciate that the form of the unified equations does not change with changing bit position definitions, but the particular unified equation used for each bit position, and whether that bit position depends on $r_x$, or $r_y$, can change.

In general, then, for the exemplary modulation constellation of FIG. 3A, the bit soft value for the bit position used to indicate the sign of the real component of a symbol sample is given by $\lambda'_i = -4r_x + |r_x + 2| - |r_x - 2|$, the bit soft value for the bit position used to indicate the sign of the imaginary component of the symbol sample is given by $\lambda'_i = -4r_y + |r_y + 2| - |r_y - 2|$, the bit soft value for the bit position used to indicate whether the symbol sample lies in the inner two or the outer two columns of the constellation is given by $\lambda'_i = -4 + 2|r_x|$, and the bit soft value for the bit position used to indicate whether the symbol sample lies within the inner two or the outer two rows is given by $\lambda'_i = -4 + 2|r_y|$. Similar generalizations are apparent for the exemplary 64QAM constellation shown in FIG. 5.

While the above exemplary equations made use of one or more scaling values to normalize the symbol samples with respect to the nominal modulation constellation, one or more exemplary embodiments of the present invention adopt an alternative approach wherein the nominal modulation constellation is scaled as a function of the received signal amplitude. That is, instead of normalizing the amplitude scale of the received symbols to match the amplitude scale of the nominal modulation constellation, the nominal modulation constellation is scaled to match the amplitude scale of the received symbols. Note that soft-value processor 40 and/or baseband processor 38 of mobile terminal 12 can be configured to operate as scaling circuits, either for scaling the symbol samples to generate scaled symbol samples, to scale the nominal modulation constellation to generate a scaled nominal modulation constellation.

With the constellation scaling approach, $2a$ is the spacing of the scaled nominal modulation constellation, i.e., the distance between the nearest two symbols in the scaled nominal modulation constellation. The equations for the 16QAM constellation of FIG. 3A according to this approach are given as, $$\begin{cases} \lambda'_1 = |ar_x + 2a^2| - |ar_x - 2a^2| - 4ar_x \\ \lambda'_2 = |ar_y + 2a^2| - |ar_y - 2a^2| - 4ar_y \\ \lambda'_3 = 2|ar_x| - 4a^2 \\ \lambda'_4 = 2|ar_y| - 4a^2. \end{cases} \quad (20)$$

Similar constellation scaling applies to the 64QAM case as shown, $$\begin{cases} \lambda'_1 = |ar_x + 2a^2| - |ar_x - 2a^2| + \\ \quad |ar_x + 4a^2| - |ar_x - 4a^2| + \\ \quad |ar_x + 6a^2| - |ar_x - 6a^2| - 8ar_x \\ \lambda'_2 = |ar_y + 2a^2| - |ar_y - 2a^2| + \\ \quad |ar_y + 4a^2| - |ar_y - 4a^2| + \\ \quad |ar_y + 6a^2| - |ar_y - 6a^2| - 8ar_y \\ \lambda'_3 = 4|ar_x| - ||ar_x| - 2a^2| + ||ar_x| - 6a^2| - 16a^2 \\ \lambda'_4 = 4|ar_y| - ||ar_y| - 2a^2| + ||ar_y| - 6a^2| - 16a^2 \\ \lambda'_5 = |2|ar_x| - 8a^2| - 4a^2 \\ \lambda'_6 = |2|ar_y| - 8a^2| - 4a^2. \end{cases} \quad (21)$$

Of course, in the above unified equations, it is apparent that pairs of the equations differ only by the use of the real or imaginary symbol components. Thus, rather than storing six unified equations in the 64QAM example given above, only three equations would be stored. Then, to compute the bit soft value for a given bit position, the processing logic would select the appropriate unified equation and the appropriate one of the real and imaginary symbol sample components in dependence on the particular Gray-code mapping being used in the given application.

Regardless, the exemplary mobile terminal 12 can be configured to store or otherwise embody the logical representations of the unified equations, such as by storing them in memory device(s) 42, as coded program instructions, look-up values, etc. In that respect, the present invention may be embodied in hardware, software, or some combination thereof. It should be understood that the present invention may comprise in whole or in part stored program instructions, micro-code, software, or other logical program representations however stored, for execution by a logic processing circuit, which in an exemplary embodiment comprises soft-value processor 40 implemented as all or part of a DSP, microcontroller, microprocessor, ASIC, FPGA, Programmable Logic Device (PLD), or other type of processor.

Also, it should be understood that soft-value processor may be implemented separately from other baseband processing functions, and that the physical circuit implementation of mobile terminal 12 may vary from that illustrated without departing from the scope of the present invention. Indeed, the present invention is not limited by the foregoing details. Rather, the present invention is limited only by the following claims and their reasonable equivalents.

What is claimed is:

1. A method of computing bit soft values from Gray-coded modulation symbols in a received communication signal comprising:

providing a set of unified equations, each unified equation corresponding to a bit position of the bit soft values to be computed irrespective of which region of a nominal modulation constellation the corresponding symbol lies within and yielding the exact solution as an applicable regional equation selected from a set of regional equations associated with a nominal modulation constellation for that bit position;

generating symbol samples of the Gray-coded modulation symbols in the received communication signal, each symbol sample comprising real and imaginary components;

scaling either the symbol samples or the nominal modulation constellation to compensate for a received amplitude of the modulation symbols; and determining bit soft values for each symbol sample based on, for each bit position to be determined, calculating the bit soft value by solving the corresponding unified equation using either the real or the imaginary component of the symbol sample depending on the bit position.

2. The method of claim 1, wherein scaling either the symbol samples or the nominal modulation constellation to compensate for a received amplitude of the modulation symbols comprises scaling the symbol samples to normalize their amplitudes with respect to the nominal modulation constellation.

3. The method of claim 2, wherein scaling the symbol samples to normalize their amplitudes with respect to the nominal modulation constellation comprises compensating the symbol samples for the effects and gains of a channel and filters associated with the received communication symbol.

4. The method of claim 3, wherein the received communication signal comprises a traffic channel signal that is transmitted at a gain relative to a reference signal transmitted in association with the traffic channel signal, and wherein compensating the symbol samples for the effects and gains of a channel and filters comprises compensating for a traffic-to-reference channel gain.

5. The method of claim 2, wherein scaling the symbol samples to normalize their amplitudes with respect to the nominal modulation constellation comprises forming a scaling value as a ratio of the square root of the average nominal energy of the nominal modulation constellation and the average signal-to-noise ratio of the symbol samples, and scaling the symbol samples based on the scaling value.

6. The method of claim 2, wherein scaling the symbol samples to normalize their amplitudes with respect to the nominal modulation constellation comprises forming a scaling value as a ratio of the square root of the average nominal energy of the nominal modulation constellation and the average energy of the symbol samples, and scaling the symbol samples based on the scaling value.

7. The method of claim 1, wherein scaling either the symbol samples or the nominal modulation constellation to compensate for a received amplitude of the modulation symbols comprises scaling the nominal modulation constellation based on the received amplitude of the modulation symbols.

8. The method of claim 1, wherein scaling either the symbol samples or the nominal modulation constellation to compensate for a received amplitude of the modulation symbols comprises scaling the nominal modulation constellation.

9. The method of claim 8, wherein scaling the nominal modulation constellation comprises scaling a nominal symbol spacing of the nominal modulation constellation based on an average signal-to-noise ratio of the symbol samples.

10. The method of claim 8, wherein scaling the nominal modulation constellation comprises scaling a nominal symbol spacing of the nominal modulation constellation based on an average energy of the symbol samples.

11. The method of claim 1, wherein providing a set of unified equations, each unified equation corresponding to a bit position of the bit soft values to be computed irrespective of which region of a nominal modulation constellation the corresponding symbol lies within and yielding the exact solution as an applicable regional equation selected from a set of regional equations associated with a nominal modulation constellation for that bit position, comprises providing stored program instructions in a digital memory embodying the set of unified equations.

12. The method of claim 1, wherein providing a set of unified equations, each unified equation corresponding to a bit position of the bit soft values to be computed irrespective of which region of a nominal modulation constellation the corresponding symbol lies within and yielding the exact solution as an applicable regional equation selected from a set of regional equations associated with a nominal modulation constellation for that bit position, comprises providing one unified equation for each bit position that comprises all regional equation terms associated with that bit position.

13. The method of claim 1, wherein providing a set of unified equations for 16QAM comprises providing a first unified equation to be used for computing the bit soft value corresponding to a sign bit of the symbol sample, wherein the first unified equation generates a first term based on a magnitude of the sum of the real or imaginary component of the symbol sample and the nominal symbol spacing, generates a second term based on a magnitude of the difference of the real or imaginary component of the symbol sample and the nominal symbol spacing, generates a third term based on four times the real or imaginary component of the symbol sample, and subtracts the second and third terms from the first term.

14. The method of claim 13, wherein providing a set of unified equations for 16QAM comprises providing a second unified equation to be used for computing the bit soft value for the bit positions used to indicate whether the symbol sample lies in inner or outer rows of the nominal modulation constellation, or to indicate whether the symbol sample lies in inner or outer columns of the nominal modulation constellation, and wherein the second unified equation generates a first term based on two times the magnitude of the real or imaginary component of the symbol sample, generates a second term based on twice the nominal symbol spacing, and subtracts the second term from the first term.

15. The method of claim 1, wherein providing a set of unified equations for 16QAM comprises providing a first unified equation to be used for computing the bit soft values for bit positions corresponding to the signs of the real and imaginary components, and providing a second unified equation to be used for computing the bit soft values for bit positions indicating whether the symbol sample lies in inner or outer columns of the nominal modulation constellation, and for bit positions indicating whether the symbol sample lies in inner or outer rows of the nominal modulation constellation.

16. The method of claim 1, wherein providing a set of unified equations comprises providing unified equations in the form of:

$$\begin{cases} \lambda'_1 = |r_x + 2a| - |r_x - 2a| - 4r_x \\ \lambda'_2 = |r_y + 2a| - |r_y - 2a| - 4r_y \\ \lambda'_3 = 2|r_x| - 4a \\ \lambda'_4 = 2|r_y| - 4a, \end{cases}$$

where $\lambda'_{1 \ldots 4}$ correspond to the four bit positions associated with 16QAM, $r_x$ and $r_y$ are the real and imaginary components, respectively, of the symbol sample, and 2a is the spacing of the nominal modulation constellation.

17. The method of claim 16, further comprising using the unified equation for $\lambda'_1$ to compute the bit soft value for the bit position used to indicate the sign of the real component of the symbol sample, using the equation for $\lambda'_2$ to compute the bit soft value for the bit position used to indicate the sign of the imaginary component of the symbol sample, using the equation for $\lambda'_3$ to compute the bit soft value for the bit position used to indicate whether the symbol sample lies in an inner or an outer column of the nominal modulation constellation, and using the equation for $\lambda'_4$ to compute the bit soft value for the bit position used to indicate whether the symbol sample lies in an inner or an outer row of the nominal modulation constellation.

18. The method of claim 1, wherein providing a set of unified equations for 64QAM comprises providing unified equations in the form of:

$$\begin{cases} \lambda'_1 = |r_x + 2a| - |r_x - 2a| + \\ \quad |r_x + 4a| - |r_x - 4a| + \\ \quad |r_x + 6a| - |r_x - 6a| - 8r_x \\ \lambda'_2 = |r_y + 2a| - |r_y - 2a| + \\ \quad |r_y + 4a| - |r_y - 4a| + \\ \quad |r_y + 6a| - |r_y - 6a| - 8r_y \\ \lambda'_3 = 4|r_x| - ||r_x| - 2a| + ||r_x| - 6a| - 16a \\ \lambda'_4 = 4|r_y| - ||r_y| - 2a| + ||r_y| - 6a| - 16a \\ \lambda'_5 = |2|r_x| - 8a| - 4a \\ \lambda'_6 = |2|r_y| - 8a| - 4a, \end{cases}$$

where $\lambda'_{1 \ldots 6}$ correspond to the six bit positions associated with 64QAM, $r_x$ and $r_y$ are the real and imaginary components, respectively, of the symbol sample, and 2a is the spacing of the nominal modulation constellation.

19. The method of claim 1, further comprising scaling the computed bit soft values by the signal-to-noise ratio of the symbol samples.

20. The method of claim 1, further comprising scaling the computed bit soft values by the average energy of the symbol samples.

21. The method of claim 1, further comprising scaling the computed bit soft values as a function of noise in the symbol samples.

22. The method of claim 1, further comprising scaling the computed bit soft values based on the inverse of the noise power in the symbol samples.

23. The method of claim 1, further comprising providing one or more correction terms for each of the unified equations that, for each symbol sample, compensate the bit soft values for one or more additional nearest-neighbors of the symbol sample in the nominal modulation constellation.

24. The method of claim 1, further comprising compensating the unified equations using one or more multi-regional compensation terms that compensate the bit soft values computed from the unified equations for the effects of constellation points lying in two or more regions of the nominal modulation constellation.

25. The method of claim 1, wherein scaling either the symbol samples or the nominal modulation constellation to compensate for a received amplitude of the modulation symbols comprises scaling the nominal modulation constellation to obtain a scaled nominal modulation constellation.

26. The method of claim 25, wherein, for 16QAM, providing a set of unified equations comprises providing the following first and second unified equations, respectively, for computation of the bit soft value for an i-th bit position:

$$\lambda'_i = |ar_{x\ or\ y} + 2a^2| - |ar_{x\ or\ y} - 2a^2| - 4ar_{x\ or\ y}, \text{ and}$$

$$\lambda'_i = 2|ar_{x\ or\ y}| - 4a^2,$$

wherein 2a comprises the symbol spacing of the scaled nominal modulation constellation, $r_x$ comprises the real component of a symbol sample, and $r_y$ comprises the imaginary component of the symbol sample.

27. The method of claim 26, further comprising using the first unified equation in conjunction with the real component, $r_x$, of the symbol sample to compute the bit soft value for the bit position used to indicate the sign of the real component of the symbol sample, using the first unified equation in conjunction with the imaginary component, $r_y$, of the symbol sample to compute the bit soft value for the bit position used to indicate the sign of the imaginary component of the symbol sample, using the second unified equation in conjunction with the real component, $r_x$, to compute the bit soft value for the bit position used to indicate whether the symbol sample lies in an inner or in an outer column of the nominal modulation constellation, and using the second unified equation in conjunction with the imaginary component, $r_y$, to compute the bit soft value for the bit position used to indicate whether the symbol sample lies in an inner or in an outer row of the nominal modulation constellation.

28. The method of claim 26, further comprising selecting a particular one of the two unified equations, and one of the $r_x$ and $r_y$ components, to compute the bit soft value for the i-th bit position based on a particular Gray-code mapping adopted for the nominal modulation constellation.

29. The method of claim 1, wherein, for 64QAM, providing a set of unified equations comprises providing the following three equations for computation of the i-th bit position:

$$\lambda'_i = -8ar_{x\ or\ y} + |ar_{x\ or\ y} + 2a^2| - |ar_{x\ or\ y} - 2a^2| +$$
$$|ar_{x\ or\ y} + 4a^2| - |ar_{x\ or\ y} - 4a^2| +$$
$$|ar_{x\ or\ y} + 6a^2| - |ar_{x\ or\ y} - 6a^2|,$$

$$\lambda'_i = -16a^2 + 4|ar_{x\ or\ y}| - ||ar_{x\ or\ y}| - 2a^2| +$$
$$||ar_{x\ or\ y}| - 6a^2|, \text{ and}$$

$$\lambda'_i = -4a^2 + |2|ar_{x\ or\ y}| - 8a^2|,$$

wherein 2a comprises the spacing of the scaled nominal modulation constellation, $r_x$ comprises the real component of the symbol sample, and $r_y$, comprises the imaginary component of the symbol sample.

30. The method of claim 29, further comprising selecting a particular one of the three unified equations, and one of the $r_x$ and $r_y$ components, to compute the bit soft value for the i-th bit position based on a particular Gray-code mapping adopted for the nominal modulation constellation.

31. An Application Specific Integrated Circuit (ASIC) for computing bit soft values from Gray-coded modulation symbols in a received communication signal, the ASIC comprising:

a scaling circuit to scale symbol samples corresponding to the Gray-coded modulation symbols in the received communication signal, or to scale a nominal modulation constellation with respect to the symbol samples, each symbol sample comprising real and imaginary components; and a calculation circuit to carry out bit soft value determinations based on a set of unified equations, each unified equation corresponding to a bit position of the bit soft values to be computed irrespective of which region of the nominal modulation constellation the corresponding symbol lies within and yielding the exact solution as an applicable regional equation selected from a set of regional equations associated with the nominal modulation constellation for that bit position;

said calculation circuit configured to determine the bit soft values for each symbol sample based on calculating a bit soft value for each bit position by solving the corresponding unified equation using either the real or the imaginary component of the symbol sample depending on the bit position.

32. The ASIC of claim 31, wherein the scaling circuit is configured to scale the symbol samples to normalize their amplitudes with respect to the nominal modulation constellation.

33. The ASIC of claim 32, wherein scaling circuit is configured to normalize the symbol sample amplitudes with respect to the nominal modulation constellation by compensating the symbol samples for the effects and gains of a channel and filters associated with the received communication symbol.

34. The ASIC of claim 33, wherein the received communication signal comprises a traffic channel signal that is transmitted at a gain relative to a reference signal transmitted in association with the traffic channel signal, and wherein the scaling circuit is configured to compensate the symbol samples for the effects of a traffic-to-reference channel gain.

35. The ASIC of claim 32, wherein the scaling circuit is configured to normalize the amplitudes of the symbol samples by forming a scaling value as a ratio of the square root of the average nominal energy of the nominal modulation constellation and the average signal-to-noise ratio of the symbol samples, and scaling the symbol samples based on the scaling value.

36. The ASIC of claim 32, wherein the scaling circuit is configured to normalize the amplitudes of the symbol samples by forming a scaling value as a ratio of the square root of the average nominal energy of the nominal modulation constellation and the average energy of the symbol samples, and scaling the symbol samples based on the scaling value.

37. The ASIC of claim 31, wherein the scaling circuit is configured to scale the nominal modulation constellation based on the received amplitude of the modulation symbols.

38. The ASIC of claim 31, wherein the scaling circuit is configured to scale the nominal modulation constellation based on an average signal-to-noise ratio of the symbol samples.

39. The ASIC of claim 31, wherein the scaling circuit is configured to scale the nominal modulation constellation by scaling a nominal symbol spacing of the nominal modulation constellation based on an average energy of the symbol samples.

40. The ASIC of claim 31, wherein the set of unified equations comprise stored program instructions in a digital memory embodying the set of unified equations.

41. The ASIC of claim 31, wherein the set of unified equations comprises one unified equation for each bit position that comprises all regional equation terms associated with that bit position.

42. The ASIC of claim 31, wherein the set of unified equations for 16QAM comprises a first unified equation to be used for computing the bit soft value corresponding to a sign bit of the symbol sample, wherein the first unified equation generates a first term based on a magnitude of the sum of the real or imaginary component of the symbol sample and the nominal symbol spacing, generates a second term based on a magnitude of the difference of the real or imaginary component of the symbol sample and the nominal symbol spacing, generates a third term based on four times the real or imaginary component of the symbol sample, and subtracts the second and third terms from the first term.

43. The ASIC of claim 42, wherein the set of unified equations for 16QAM further comprises a second unified equation to be used for computing the bit soft value for the bit positions used to indicate whether the symbol sample lies in inner or outer rows of the nominal modulation constellation, or to indicate whether the symbol sample lies in inner or outer columns of the nominal modulation constellation, and wherein the second unified equation generates a first term based on two times the magnitude of the real or imaginary component of the symbol sample, generates a second term based on twice the nominal symbol spacing, and subtracts the second term from the first term.

44. The ASIC of claim 31, wherein the set of unified equations for 16QAM comprises a first unified equation to be used for computing the bit soft values for bit positions corresponding to the signs of the real and imaginary components, and providing a second unified equation to be used for computing the bit soft values for bit positions indicating whether the symbol sample lies in inner or outer columns of the nominal modulation constellation, and for bit positions indicating whether the symbol sample lies in inner or outer rows of the nominal modulation constellation.

45. The ASIC of claim 31, wherein the set of unified equations comprises unified equations in the form of:

$$\begin{cases} \lambda'_1 = |r_x + 2a| - |r_x - 2a| - 4r_x \\ \lambda'_2 = |r_y + 2a| - |r_y - 2a| - 4r_y \\ \lambda'_3 = 2|r_x| - 4a \\ \lambda'_4 = 2|r_y| - 4a, \end{cases}$$

where $\lambda'_{1 \ldots 4}$ correspond to the four bit positions associated with 16QAM, $r_x$ and $r_y$ are the real and imaginary components, respectively, of the symbol sample, and 2a is the spacing of the nominal modulation constellation.

46. The ASIC of claim 45, wherein the calculation circuit is configured to use the unified equation for $\lambda'_1$ to compute the bit soft value for the bit position used to indicate the sign of the real component of the symbol sample, use the equation for $\lambda'_2$ to compute the bit soft value for the bit position used to indicate the sign of the imaginary component of the symbol sample, use the equation for $\lambda'_3$ to compute the bit soft value for the bit position used to indicate whether the symbol sample lies in an inner or an outer column of the nominal modulation constellation, and use the equation for $\lambda'_4$ to compute the bit soft value for the bit position used to indicate whether the symbol sample lies in an inner or an outer row of the nominal modulation constellation.

47. The ASIC of claim 31, wherein the set of unified equations for 64QAM comprises unified equations in the form of:

$$\begin{cases} \lambda'_1 = |r_x + 2a| - |r_x - 2a| + |r_x + 4a| - |r_x - 4a| + \\ \qquad |r_x + 6a| + |r_x - 6a| - 8r_x \\ \lambda'_2 = |r_y + 2a| - |r_y - 2a| + |r_y + 4a| - |r_y - 4a| + \\ \qquad |r_y + 6a| + |r_y - 6a| - 8r_y \\ \lambda'_3 = 4|r_x| - ||r_x| - 2a| + ||r_x| - 6a| - 16a \\ \lambda'_4 = 4|r_y| - ||r_y| - 2a| + ||r_y| - 6a| - 16a \\ \lambda'_5 = |2|r_x| - 8a| - 4a \\ \lambda'_6 = |2|r_y| - 8a| - 4a, \end{cases}$$

where $\lambda'_{1 \ldots 6}$ correspond to the six bit positions associated with 64QAM, $r_x$ and $r_y$ are the real and imaginary components, respectively, of the symbol sample, and 2a is the spacing of the nominal modulation constellation.

48. The ASIC of claim 31, wherein the ASIC is configured to further scale the computed bit soft values by the signal-to-noise ratio of the symbol samples.

49. The ASIC of claim 31, wherein the ASIC is configured to further scale the computed bit soft values by the average energy of the symbol samples.

50. The ASIC of claim 31, wherein the ASIC is configured to further scale the computed bit soft values as a function of noise in the symbol samples.

51. The ASIC of claim 31, wherein the ASIC is configured to further scale the computed bit soft values based on the inverse of the noise power in the symbol samples.

52. The ASIC of claim 31, wherein the ASIC is configured to apply one or more correction terms for each of the unified equations that, for each symbol sample, compensate the computed bit soft values for one or more additional nearest-neighbors of the symbol sample in the nominal modulation constellation.

53. The ASIC of claim 31, wherein the ASIC is configured to compensate the unified equations using one or more multi-regional compensation terms that compensate the bit soft values computed from the unified equations for the effects of constellation points lying in two or more regions of the nominal modulation constellation.

54. The ASIC of claim 31, wherein the scaling circuit is configured to scale the nominal modulation constellation to obtain a scaled nominal modulation constellation, and wherein the set of unified equations comprises the following first and second unified equations, respectively, for computation of the bit soft value for an i-th bit position:

$$\lambda'_i = |ar_{x \, or \, y} + 2a^2| - |ar_{x \, or \, y} - 2a^2| - 4ar_{x \, or \, y}, \text{ and}$$

$$\lambda'_i = 2|ar_{x \, or \, y}| - 4a^2,$$

wherein 2a comprises the symbol spacing of the scaled nominal modulation constellation, $r_x$ comprises the real component of the symbol sample, and $r_y$ comprises the imaginary component of the symbol sample.

55. The ASIC of claim 54, wherein the ASIC is configured to use the first unified equation in conjunction with the real component, $r_x$, of the symbol sample to compute the bit soft value for the bit position used to indicate the sign of the real component of the symbol sample, use the first unified equation in conjunction with the imaginary component, $r_y$, of the symbol sample to compute the bit soft value for the bit position used to indicate the sign of the imaginary component of the symbol sample, use the second unified equation in conjunction with the real component, $r_x$, to compute the bit soft value for the bit position used to indicate whether the symbol sample lies in an inner or in an outer column of the nominal modulation constellation, and use the second unified equation in conjunction with the imaginary component, $r_y$, to compute the bit soft value for the bit position used to indicate whether the symbol sample lies in an inner or in an outer row of the nominal modulation constellation.

56. The ASIC of claim 54, further comprising selecting a particular one of the two unified equations, and one of the $r_x$ and $r_y$ components, to compute the bit soft value for the i-th bit position based on a particular Gray-code mapping adopted for the nominal modulation constellation.

57. The ASIC of claim 31, wherein, for 64QAM, the set of unified equations comprises the following three equations for computation of the i-th bit position:

$$\lambda'_i = -8ar_{x\,or\,y} + |ar_{x\,or\,y} + 2a^2| - |ar_{x\,or\,y} - 2a^2| + |ar_{x\,or\,y} + 4a^2| -$$
$$|ar_{x\,or\,y} - 4a^2| + |ar_{x\,or\,y} + 6a^2| - |ar_{x\,or\,y} - 6a^2|,$$
$$\lambda'_i = -16a^2 + 4|ar_{x\,or\,y}| - ||ar_{x\,or\,y}| - 2a^2| + ||ar_{x\,or\,y}| - 6a^2|, \text{ and}$$
$$\lambda'_i = -4a^2 + |2|ar_{x\,or\,y}| - 8a^2|,$$

wherein 2a comprises the spacing of the scaled nominal modulation constellation, $r_x$ comprises the real component of the symbol sample, and $r_y$ comprises the imaginary component of the symbol sample.

58. The ASIC of claim 57, wherein, for each symbol sample, the ASIC is configured to select a particular one of the three unified equations, and one of the $r_x$ and $r_y$ components, to compute the bit soft value for the i-th bit position based on a particular Gray-code mapping adopted for the nominal modulation constellation.

59. A computer readable medium storing a computer program for computing bit soft values from Gray-coded modulation symbols in a received communication signal, the computer program comprising:

program instructions to scale symbol samples corresponding to the Gray-coded modulation symbols in the received communication signal, or to scale a nominal modulation constellation with respect to the symbol samples, each symbol sample comprising real and imaginary components;

program instructions to implement a set of unified equations, each unified equation corresponding to a bit position of the bit soft values to be computed irrespective of which region of the nominal modulation constellation the corresponding symbol lies within and yielding the exact solution as an applicable regional equation selected from a set of regional equations associated with the nominal modulation constellation for that bit position; and program instructions to determine the bit soft values for each symbol sample based on calculating a bit soft value for each bit position by solving the corresponding unified equation using either the real or the imaginary component of the symbol sample depending on the bit position.

60. The computer readable medium storing a computer program of claim 59, wherein the set of unified equations comprises one unified equation for each bit position that comprises all regional equation terms associated with that bit position.

61. The computer readable medium storing a computer program of claim 59, wherein, the set of unified equations for 16QAM comprises a first unified equation to be used for computing the bit soft value corresponding to a sign bit of the symbol sample, wherein the first unified equation generates a first term based on a magnitude of the sum of the real or imaginary component of the symbol sample and the nominal symbol spacing, generates a second term based on a magnitude of the difference of the real or imaginary component of the symbol sample and the nominal symbol spacing, generates a third term based on four times the real or imaginary component of the symbol sample, and subtracts the second and third terms from the first term.

62. The computer readable medium storing a computer program of claim 61, wherein the set of unified equations for 16QAM further comprises a second unified equation to be used for computing the bit soft value for the bit positions used to indicate whether the symbol sample lies in inner or outer rows of the nominal modulation constellation, or to indicate whether the symbol sample lies in inner or outer columns of the nominal modulation constellation, and wherein the second unified equation generates a first term based on two times the magnitude of the real or imaginary component of the symbol sample, generates a second term based on twice the nominal symbol spacing, and subtracts the second term from the first term.

63. The computer readable medium storing a computer program of claim 59, wherein the set of unified equations for 16QAM comprises a first unified equation to be used for computing the bit soft values for bit positions corresponding to the signs of the real and imaginary components, and a second unified equation to be used for computing the bit soft values for bit positions indicating whether the symbol sample lies in inner or outer columns of the nominal modulation constellation, and for bit positions indicating whether the symbol sample lies in inner or outer rows of the nominal modulation constellation.

64. The computer readable medium storing a computer program of claim 59, wherein the set of unified equations comprises unified equations in the form of:

$$\begin{cases} \lambda'_1 = |r_x + 2a| - |r_x - 2a| - 4r_x \\ \lambda'_2 = |r_y + 2a| - |r_y - 2a| - 4r_y \\ \lambda'_3 = 2|r_x| - 4a \\ \lambda'_4 = 2|r_y| - 4a, \end{cases}$$

where $\lambda'_{1\ldots 4}$ correspond to the four bit positions associated with 16QAM, $r_x$ and $r_y$ are the real and imaginary components, respectively, of the symbol sample, and 2a is the spacing of the nominal modulation constellation.

65. The computer readable medium storing a computer program of claim 64, wherein the program instructions to determine the bit soft values comprise program instructions to use the unified equation for $\lambda'_1$ to compute the bit soft value for the bit position used to indicate the sign of the real component of the symbol sample, use the equation for $\lambda'_2$ to compute the bit soft value for the bit position used to indicate the sign of the imaginary component of the symbol sample, use the equation for $\lambda'_3$ to compute the bit soft value for the bit position used to indicate whether the symbol sample lies in an inner or an outer column of the nominal modulation constellation, and use the equation for $\lambda'_4$ to compute the bit soft value for the bit position used to indicate whether the symbol sample lies in an inner or an outer row of the nominal modulation constellation.

66. The computer readable medium storing a computer program of claim 59, wherein the set of unified equations for 64QAM comprises unified equations in the form of:

$$\begin{cases} \lambda'_1 = |r_x + 2a| - |r_x - 2a| + |r_x + 4a| - |r_x - 4a| + \\ \quad |r_x + 6a| + |r_x - 6a| - 8r_x \\ \lambda'_2 = |r_y + 2a| - |r_y - 2a| + |r_y + 4a| - |r_y - 4a| + \\ \quad |r_y + 6a| + |r_y - 6a| - 8r_y \\ \lambda'_3 = 4|r_x| - ||r_x| - 2a| + ||r_x| - 6a| - 16a \\ \lambda'_4 = 4|r_y| - ||r_y| - 2a| + ||r_y| - 6a| - 16a \\ \lambda'_5 = |2|r_x| - 8a| - 4a \\ \lambda'_6 = |2|r_y| - 8a| - 4a, \end{cases}$$

where $\lambda'_{1 \ldots 6}$ correspond to the six bit positions associated with 64QAM, $r_x$ and $r_y$ are the real and imaginary components, respectively, of the symbol sample, and 2a is the spacing of the nominal modulation constellation.

67. The computer readable medium storing a computer program of claim 59, wherein the computer program further comprises program instructions to implement one or more correction terms for each of the unified equations that, for each symbol sample, compensate the bit soft values for one or more additional nearest-neighbors of the symbol sample in the nominal modulation constellation.

68. The computer readable medium storing a computer program of claim 59, wherein the computer program further comprises program instructions to compensate the unified equations using one or more multi-regional compensation terms that compensate the bit soft values computed from the unified equations for the effects of constellation points lying in two or more regions of the nominal modulation constellation.

69. The computer readable medium storing a computer program of claim 59, wherein the program instructions to scale the symbol samples or the nominal modulation constellation comprise program instructions to scale the nominal modulation constellation to obtain a scaled nominal modulation constellation.

70. The computer readable medium storing a computer program of claim 69, wherein, for 16QAM, providing the set of unified equations comprises the following first and second unified equations, respectively, for computation of the bit soft value for an i-th bit position:

$$\lambda'_i = |ar_{x\,or\,y} + 2a^2| - |ar_{x\,or\,y} - 2a^2| - 4ar_{x\,or\,y}, \text{ and}$$

$$\lambda'_i = 2|ar_{x\,or\,y}| - 4a^2,$$

wherein 2a comprises the symbol spacing of the scaled nominal modulation constellation, $r_x$ comprises the real component of a symbol sample, and $r_y$ comprises the imaginary component of the symbol sample.

71. The computer readable medium storing a computer program of claim 70, wherein the program instructions to determine the bit soft values comprise program instructions to use the first unified equation in conjunction with the real component, $r_x$, of the symbol sample to compute the bit soft value for the bit position used to indicate the sign of the real component of the symbol sample, use the first unified equation in conjunction with the imaginary component, $r_y$, of the symbol sample to compute the bit soft value for the bit position used to indicate the sign of the imaginary component of the symbol sample, use the second unified equation in conjunction with the real component, $r_x$, to compute the bit soft value for the bit position used to indicate whether the symbol sample lies in an inner or in an outer column of the nominal modulation constellation, and use the second unified equation in conjunction with the imaginary component, $r_y$, to compute the bit soft value for the bit position used to indicate whether the symbol sample lies in an inner or in an outer row of the nominal modulation constellation.

72. The computer readable medium storing a computer program of claim 71, wherein the program instructions to determine the bit soft values comprise program instructions to select a particular one of the two unified equations, and one of the $r_x$ and $r_y$ components, to compute the bit soft value for the i-th bit position based on a particular Gray-code mapping adopted for the nominal modulation constellation.

73. The computer readable medium storing a computer program of claim 59, wherein, for 64QAM, the set of unified equations comprises the following three equations for computation of the i-th bit position:

$$\lambda'_i = -8ar_{x\,or\,y} + |ar_{x\,or\,y} + 2a^2| - |ar_{x\,or\,y} - 2a^2| + |ar_{x\,or\,y} + 4a^2| - $$
$$|ar_{x\,or\,y} - 4a^2| + |ar_{x\,or\,y} + 6a^2| - |ar_{x\,or\,y} - 6a^2|,$$

$$\lambda'_i = -16a^2 + 4|ar_{x\,or\,y}| - ||ar_{x\,or\,y}| - 2a^2| + ||ar_{x\,or\,y}| - 6a^2|, \text{ and}$$

$$\lambda'_i = -4a^2 + |2|ar_{x\,or\,y}| - 8a^2|,$$

wherein 2a comprises the spacing of the scaled nominal modulation constellation, $r_x$ comprises the real component of the symbol sample, and $r_y$ comprises the imaginary component of the symbol sample.

74. The computer readable medium storing a computer program of claim 73, wherein the program instructions to determine the bit soft values comprise program instructions to select a particular one of the three unified equations, and one of the $r_x$ and $r_y$ components, to compute the bit soft value for the i-th bit position based on a particular Gray-code mapping adopted for the nominal modulation constellation.

75. A mobile terminal for use in a wireless communication network comprising:
a transmitter circuit configured to transmit signals to the wireless communication network;
a receiver circuit configured to receive signals from the wireless communication network, including a received communication signal that comprises Gray-coded modulation symbols; and
a processing circuit to process symbol samples corresponding to the Gray-coded modulation symbols in the received communication signal, wherein said processing circuit is configured to:
scale symbol samples corresponding to the Gray-coded modulation symbols in the received communication signal to generate symbol samples that are normalized with respect to a nominal modulation constellation, each symbol sample comprising real and imaginary components, or scale the nominal modulation constellation relative to the received symbol samples;

implement a set of unified equations, each unified equation corresponding to a bit position of the bit soft values to be computed irrespective of which region of a nominal modulation constellation the corresponding symbol lies within and yielding the exact solution as an applicable regional equation selected from a set of regional equations associated with the nominal modulation constellation for that bit position; and determine the bit soft values for each symbol sample based on the set of unified equations based on, for each bit position, calculating the bit soft value by solving the corresponding unified equation using either the real or the imaginary component of the symbol sample depending on the bit position.

76. The mobile terminal of claim 75, wherein the set of unified equations for 16QAM comprises a first unified equation to be used for computing the bit soft value corresponding to a sign bit of the symbol sample, wherein the first unified equation generates a first term based on a magnitude of the sum of the real or imaginary component of the symbol sample and the nominal symbol spacing, generates a second term based on a magnitude of the difference of the real or imaginary component of the symbol sample and the nominal symbol spacing, generates a third term based on four times the real or imaginary component of the symbol sample, and subtracts the second and third terms from the first term.

77. The mobile terminal of claim 76, wherein the set of unified equations for 16QAM further comprises a second unified equation to be used for computing the bit soft value for the bit positions used to indicate whether the symbol sample lies in inner or outer rows of the nominal modulation constellation, or to indicate whether the symbol sample lies in inner or outer columns of the nominal modulation constellation, and wherein the second unified equation generates a first term based on two times the magnitude of the real or imaginary component of the symbol sample, generates a second term based on twice the nominal symbol spacing, and subtracts the second term from the first term.

78. The mobile terminal of claim 75, wherein the set of unified equations for 16QAM comprises a first unified equation to be used for computing the bit soft values for bit positions corresponding to the signs of the real and imaginary components, and a second unified equation to be used for computing the bit soft values for bit positions indicating whether the symbol sample lies in inner or outer columns of the nominal modulation constellation, and for bit positions indicating whether the symbol sample lies in inner or outer rows of the nominal modulation constellation.

79. The mobile terminal of claim 75, wherein the set of unified equations comprises unified equations in the form of:

$$\begin{cases} \lambda'_1 = |r_x + 2a| - |r_x - 2a| - 4r_x \\ \lambda'_2 = |r_y + 2a| - |r_y - 2a| - 4r_y \\ \lambda'_3 = 2|r_x| - 4a \\ \lambda'_4 = 2|r_y| - 4a, \end{cases}$$

where $\lambda'_{1\ldots4}$ correspond to the four bit positions associated with 16QAM, $r_x$ and $r_y$ are the real and imaginary components, respectively, of the symbol sample, and 2a is the spacing of the nominal modulation constellation.

80. The mobile terminal of claim 79, wherein the processing circuit is configured to use the unified equation for $\lambda'_1$ to compute the bit soft value for the bit position used to indicate the sign of the real component of the symbol sample, use the equation for $\lambda'_2$ to compute the bit soft value for the bit position used to indicate the sign of the imaginary component of the symbol sample, use the equation for $\lambda'_3$ to compute the bit soft value for the bit position used to indicate whether the symbol sample lies in an inner or an outer column of the nominal modulation constellation, and use the equation for $\lambda'_4$ to compute the bit soft value for the bit position used to indicate whether the symbol sample lies in an inner or an outer row of the nominal modulation constellation.

81. The mobile terminal of claim 75, wherein the set of unified equations for 64QAM comprises unified equations in the form of:

$$\begin{cases} \lambda'_1 = |r_x + 2a| - |r_x - 2a| + |r_x + 4a| - |r_x - 4a| + \\ \quad |r_x + 6a| + |r_x - 6a| - 8r_x \\ \lambda'_2 = |r_y + 2a| - |r_y - 2a| + |r_y + 4a| - |r_y - 4a| + \\ \quad |r_y + 6a| + |r_y - 6a| - 8r_y \\ \lambda'_3 = 4|r_x| - ||r_x| - 2a| + ||r_x| - 6a| - 16a \\ \lambda'_4 = 4|r_y| - ||r_y| - 2a| + ||r_y| - 6a| - 16a \\ \lambda'_5 = |2|r_x| - 8a| - 4a \\ \lambda'_6 = |2|r_y| - 8a| - 4a, \end{cases}$$

where $\lambda'_{1\ldots6}$ correspond to the six bit positions associated with 64QAM, $r_x$ and $r_y$ are the real and imaginary components, respectively, of the symbol sample, and 2a is the spacing of the nominal modulation constellation.

82. The mobile terminal of claim 75, wherein the processing circuit is configured to implement one or more correction terms for each of the unified equations that, for each symbol sample, compensate the bit soft values for one or more additional nearest-neighbors of the symbol sample in the nominal modulation constellation.

83. The mobile terminal of claim 75, wherein the processing circuit is configured to compensate the unified equations using one or more multi-regional compensation terms that compensate the bit soft values computed from the unified equations for the effects of constellation points lying in two or more regions of the nominal modulation constellation.

84. The mobile terminal of claim 75, wherein the processing circuit is configured to scale the nominal modulation constellation to obtain a scaled nominal modulation constellation.

85. The mobile terminal of claim 84, wherein, for 16QAM, the set of unified equations comprises the following first and second unified equations, respectively, for computation of the bit soft value for an i-th bit position:

$$\lambda'_i = |ar_{xory} + 2a^2| - |ar_{xory} - 2a^2| - 4ar_{xory}, \text{ and}$$

$$\lambda'_i = 2|ar_{xory}| - 4a^2,$$

wherein 2a comprises the symbol spacing of the scaled nominal modulation constellation, $r_x$ comprises the real component of a symbol sample, and $r_y$ comprises the imaginary component of the symbol sample.

86. The mobile terminal of claim 85, wherein the processing circuit is configured to use the first unified equation in conjunction with the real component, $r_x$, of the symbol sample to compute the bit soft value for the bit position used to indicate the sign of the real component of the symbol sample, use the first unified equation in conjunction with the imaginary component, $r_y$, of the symbol sample to compute the bit soft value for the bit position used to indicate the sign of the imaginary component of the symbol sample, use the second unified equation in conjunction with the real component, $r_x$, to compute the bit soft value for the bit position used to indicate whether the symbol sample lies in an inner or in an outer column of the nominal modulation constellation, and use the second unified equation in conjunction with the imaginary component, $r_y$, to compute the bit soft value for the bit position used to indicate whether the symbol sample lies in an inner or in an outer row of the nominal modulation constellation.

87. The mobile terminal of claim 85, wherein the processing circuit is configured to select a particular one of the two unified equations, and one of the $r_x$ and $r_y$ components, to compute the bit soft value for the i-th bit position based on a particular Gray-code mapping adopted for the nominal modulation constellation.

88. The mobile terminal of claim 75, wherein the processing circuit is configured to scale the nominal modulation constellation to obtain a scaled nominal modulation constellation and, for 64QAM, the set of unified equations comprises the following three equations for computation of the i-th bit position:

$$\lambda'_i = -8ar_{x\,or\,y} + |ar_{x\,or\,y} + 2a^2| - |ar_{x\,or\,y} - 2a^2| + |ar_{x\,or\,y} + 4a^2| -$$
$$|ar_{x\,or\,y} - 4a^2| + |ar_{x\,or\,y} + 6a^2| - |ar_{x\,or\,y} - 6a^2|,$$
$$\lambda'_i = -16a^2 + 4|ar_{x\,or\,y}| - ||ar_{x\,or\,y}| - 2a^2| + ||ar_{x\,or\,y}| - 6a^2|, \text{ and}$$
$$\lambda'_i = -4a^2 + |2|ar_{x\,or\,y}| - 8a^2|,$$

wherein 2a comprises the spacing of the scaled nominal modulation constellation, $r_x$ comprises the real component of the symbol sample, and $r_y$ comprises the imaginary component of the symbol sample.

89. The mobile terminal of claim 88, wherein the processing circuit is configured to select a particular one of the three unified equations, and one of the $r_x$ and $r_y$ components, to compute the bit soft value for the i-th bit position based on a particular Gray-code mapping adopted for the nominal modulation constellation.

* * * * *